(12) United States Patent
Cawse et al.

(10) Patent No.: US 9,603,229 B2
(45) Date of Patent: *Mar. 21, 2017

(54) COMPOSITE MATERIALS

(71) Applicant: Hexcel Composites Limited, Cambridge (GB)

(72) Inventors: John L. Cawse, Tavistock (GB); Martin Simmons, Baldock (GB); George Green, Stapleford (GB)

(73) Assignee: Hexcel Composites Limited, Cambridge (GB)

( * ) Notice: Subject to any disclaimer, the term of this patent is extended or adjusted under 35 U.S.C. 154(b) by 69 days.

This patent is subject to a terminal disclaimer.

(21) Appl. No.: 14/614,448

(22) Filed: Feb. 5, 2015

(65) Prior Publication Data

US 2015/0156854 A1 Jun. 4, 2015

Related U.S. Application Data

(60) Division of application No. 12/221,635, filed on Aug. 5, 2008, now Pat. No. 8,980,770, which is a
(Continued)

(30) Foreign Application Priority Data

Nov. 6, 2006 (GB) .................................. 0622060.2

(51) Int. Cl.
*B32B 3/02* (2006.01)
*B32B 5/22* (2006.01)
(Continued)

(52) U.S. Cl.
CPC ................. *H05F 3/02* (2013.01); *B32B 5/22* (2013.01); *B32B 27/12* (2013.01); *B82Y 30/00* (2013.01);
(Continued)

(58) Field of Classification Search
CPC ................ B32B 2260/025; B32B 5/16; B32B 2264/105; B32B 2264/108; B32B 2305/076; B32B 2307/202; B32B 5/22
See application file for complete search history.

(56) References Cited

U.S. PATENT DOCUMENTS 4,162,496 A 7/1979 Downen et al.
4,556,591 A 12/1985 Bannink, Jr.
(Continued)

FOREIGN PATENT DOCUMENTS

EP 0651602 5/1995
GB 1212186 11/1970
(Continued)

OTHER PUBLICATIONS

Nagota et al., "Effect of Particle Size of Graphites on Electrical Conductivity of Graphite/Polymer Composite", Compoiste Interfaces, 1999, pp. 483-495.
(Continued)

*Primary Examiner* — Elizabeth M Cole
(74) *Attorney, Agent, or Firm* — W. Mark Bielawski; David J. Oldenkamp

(57) ABSTRACT

A composite material, the composite material comprising at least one prepreg, said prepreg comprising at least one polymeric resin and at least one fibrous reinforcement; and conducting particles dispersed in the polymeric resin.

20 Claims, 1 Drawing Sheet

Related U.S. Application Data continuation of application No. PCT/GB2007/004220, filed on Nov. 6, 2007.

(51) Int. Cl.
*H05F 3/02* (2006.01)
*B82Y 30/00* (2011.01)
*C08J 5/04* (2006.01)
*C08J 5/06* (2006.01)
*C08J 5/10* (2006.01)
*C08J 5/24* (2006.01)
*B32B 27/12* (2006.01)

(52) U.S. Cl.
CPC .............. *C08J 5/042* (2013.01); *C08J 5/06* (2013.01); *C08J 5/10* (2013.01); *C08J 5/24* (2013.01); *B32B 2260/021* (2013.01); *B32B 2260/023* (2013.01); *B32B 2260/046* (2013.01); *B32B 2262/106* (2013.01); *B32B 2264/02* (2013.01); *B32B 2264/10* (2013.01); *B32B 2264/105* (2013.01); *B32B 2264/108* (2013.01); *B32B 2305/076* (2013.01); *B32B 2307/202* (2013.01); *B32B 2307/206* (2013.01); *B32B 2307/212* (2013.01); *B32B 2571/00* (2013.01); *Y10S 428/929* (2013.01); *Y10S 428/931* (2013.01); *Y10T 29/49117* (2015.01); *Y10T 29/49194* (2015.01); *Y10T 428/249921* (2015.04); *Y10T 428/25* (2015.01); *Y10T 428/254* (2015.01); *Y10T 428/268* (2015.01); *Y10T 428/31504* (2015.04); *Y10T 442/209* (2015.04); *Y10T 442/2016* (2015.04); *Y10T 442/2107* (2015.04); *Y10T 442/2115* (2015.04); *Y10T 442/2123* (2015.04); *Y10T 442/2418* (2015.04); *Y10T 442/2426* (2015.04); *Y10T 442/67* (2015.04); *Y10T 442/673* (2015.04)

(56) References Cited

U.S. PATENT DOCUMENTS

| | | | |
|---|---|---|---|
| 5,057,353 A | 10/1991 | Maranci et al. |
| 5,240,761 A | 8/1993 | Calhoun et al. |
| 5,276,106 A | 1/1994 | Portelli et al. |
| 5,413,847 A | 5/1995 | Kishi et al. |
| 5,789,073 A | 8/1998 | Odagiri et al. |
| 5,853,882 A | 12/1998 | Cenedella et al. |
| 5,914,358 A | 6/1999 | Kawakita et al. |
| 5,962,348 A | 10/1999 | Bootle et al. |
| 5,985,431 A | 11/1999 | Oosedo et al. |
| 6,117,551 A | 9/2000 | Nagata et al. |
| 6,126,865 A | 10/2000 | Haak et al. |
| 6,265,333 B1 | 7/2001 | Dzenis et al. |
| 6,320,740 B1 | 11/2001 | Saito et al. |
| 6,452,479 B1 | 9/2002 | Sandbach |
| 6,592,986 B1 | 7/2003 | Hakotani et al. |
| 6,596,373 B1 | 7/2003 | Kishi et al. |
| 7,431,981 B2 | 10/2008 | Schneider |
| 8,105,964 B2 | 1/2012 | Cawse et al. |
| 8,263,503 B2 | 9/2012 | Cawse et al. |
| 8,517,300 B2 | 8/2013 | Simmons et al. |
| 2003/0006402 A1 | 1/2003 | Rao et al. |
| 2004/0169162 A1 | 9/2004 | Xiao et al. |
| 2005/0070185 A1 | 3/2005 | Schneider |
| 2006/0062977 A1 | 3/2006 | Sigler et al. |
| 2007/0212521 A1 | 9/2007 | Bessho et al. |
| 2010/0178487 A1 | 7/2010 | Arai |

FOREIGN PATENT DOCUMENTS

| | | |
|---|---|---|
| JP | 58-166050 | 10/1983 |
| JP | 61283650 | 12/1986 |
| JP | 63-166534 | 7/1988 |
| JP | 05-3828 | 1/1993 |
| JP | 7-192733 | 7/1995 |
| JP | 07176846 | 7/1995 |
| JP | 8-31231 | 2/1996 |
| JP | 8-34864 | 2/1996 |
| JP | 200155-3166 | 11/2001 |
| JP | 2002/2027017 | 1/2002 |
| JP | 2002290024 | 10/2002 |
| JP | 2004185884 | 7/2004 |
| JP | 2004359936 | 12/2004 |
| JP | 2006022130 | 1/2006 |
| RU | 2217320 | 11/2003 |
| RU | 2263581 | 6/2005 |
| WO | 02/089152 | 11/2002 |
| WO | 2004/041950 | 5/2004 |
| WO | 2004/101664 | 11/2004 |
| WO | 2005/096442 | 10/2005 |
| WO | 2008/018421 | 2/2008 |

OTHER PUBLICATIONS

Lee et al., "Mode II Interlaminar Failure Behavior of Carbon Bead-Filled Epoxy/Glass Fiber Hybrid Composites", Polymer Composites, 2000, pp. 343-352.
JP2006-214398—English translation obtained after publication of PCT/JP2007/065390 on Feb. 14, 2008, as WO2008/018421.
JP2006-312531—English translation obtained after publication of PCT/JP2007/065390 on Feb. 14, 2008, as WO2008/018421.
JP2007-038974—English translation obtained after publication of PCT/JP2007/065390 on Feb. 14, 2008, as WO2008/018421.
Japanese Office Action dated Aug. 9,—JP application 2009-535128.

COMPOSITE MATERIALS

This application is a divisional of co-pending U.S. application Ser. No. 12/221,635, filed on Aug. 5, 2008, which is a continuation of PCT/GB2007/004220, filed on Nov. 6, 2007.

BACKGROUND OF THE INVENTION

1. Field of the Invention

The present invention relates to composite materials, and particularly, but not exclusively, to fibre reinforced composite materials.

2. Description of Related Art

Composite materials are increasingly used in structural applications in many fields owing to their attractive mechanical properties and low weight in comparison to metals. Composites are known in the field to consist of layering of materials to provide a structurally advantageous laminate type material. However, whilst electrical conductivity is one of the most obvious attributes of metals, composite materials based on fibre reinforcements (such as adhesive films, surfacing films, and pre-impregnated (prepreg) materials), generally have much lower electrical conductivity.

Conventional composite materials usually consist of a reinforcement phase, generally comprising continuous or discontinuous fibres, and a matrix phase, generally a thermoset or thermoplastic polymer. Most early first generation matrix polymers for the manufacture of composites were, by nature, brittle and it has therefore been necessary to develop more toughened versions. The composites materials used as primary structures in aerospace applications tend to be so-called second or third generation toughened materials.

There is a particular need for composite materials which exhibit electrical conductivity for several applications. These applications include use for protection against lightning strikes, electrostatic dissipation (ESD), and electromagnetic interference (EMI). Prior composite materials, such as those based upon carbon fibres, are known to have some degree of electrical conductivity which is usually associated with the graphitic nature of the carbon filaments. However, the level of electrical conductivity provided is insufficient for protecting the composite material from the damaging effects of, for example, a lightning strike.

Second generation toughened composites represent an improvement over earlier first generation materials due to incorporation of toughening phases within the matrix material. Various methods for increasing electrical conductivity in these composites have been used. These methods typically include incorporation of metals into the assembly via expanded foils, metal meshes, or interwoven wires. Typical metals which are used for this purpose include aluminium, bronze and copper. These composite materials can provide better electrical conductivity. However, they are generally heavy and have significantly degraded mechanical and aesthetic properties. These composites are usually found at the first one or two plies of the material, and therefore a poor overall surface finish often results.

In the event of a lightning strike on second generation composites, damage is normally restricted to the surface protective layer. The energy of the lightning strike is typically sufficient to vaporise some of the metal and to burn a small hole in the mesh. Damage to the underlying composite may be minimal, being restricted to the top one or two plies. Nevertheless, after such a strike it would be necessary to cut out the damaged area and make good with fresh metal protection and, if required, fresh composite.

As already mentioned, materials with carbon fibres do possess some electrical conductivity. However, the conductivity pathway is only in the direction of the fibres, with limited ability for dissipation of electrical current in directions orthogonal to the plane of the fibre reinforcement (z direction). Carbon reinforced materials often comprise an interleaf structure which results in inherently low conductivity in the z direction due to the electrical insulation properties of the interleaf. The result of such an arrangement can lead to disastrous effects when damaged by lightning as the electrical discharge can enter the interleaf, volatilise the resin therein, and cause mass delamination and penetration through the composite material.

So-called third generation toughened composite materials are based on interleaf technology where resinous layers are alternated with fibre reinforced plies, and provide protection against impacts. However, these resin layers act as an electrical insulator and therefore electrical conductivity in the z direction of the material is poor (i.e. orthogonal to the direction of the fibres). Lightning strikes on the composite material can result in catastrophic failure of the component, with a hole being punched through a multiple ply laminate.

SUMMARY OF THE INVENTION

The present invention therefore seeks to provide a composite material which has improved electrical conductivity properties in comparison to prior attempts as described herein, and has little or no additional weight compared to a standard composite material. The present invention also seeks to provide a composite material which has the improved electrical conductivity without detriment to the mechanical performance of the material. The present invention further seeks to provide a method of making the composite material having improved electrical conductivity properties. A further aim is to provide a lightning strike tolerant composite material which is convenient to manufacture, use, and repair.

According to a first aspect of the present invention there is provided a composite material comprising;

i) a first conductive layer comprising a plurality of electrically conductive fibres;

ii) a second conductive layer comprising a plurality of electrically conductive fibres;

iii) a resin layer located between said first conductive fibrous layer and said second conductive fibrous layer, said resin layer comprising non-electrically conductive polymeric resin; and iv) a plurality of conductive bridges extending between said first conductive fibrous layer and said second conductive fibrous layer wherein each of said conductive bridges consists of a single electrically conductive particle.

According to a second aspect of the present invention there is provided a method of making a composite material comprising the steps of;

i) providing a first conductive layer comprising a plurality of electrically conductive fibres;

ii) providing a second conductive layer comprising a plurality of electrically conductive fibres;

iii) providing a resin layer located between said first conductive fibrous layer and said second conductive fibrous layer, said resin layer comprising non-electrically conductive polymeric resin; and iv) providing a plurality of conductive bridges extending between said first conductive fibrous layer and said second conductive fibrous layer wherein each of said conductive bridges consists of a single electrically conductive particle.

According to a third aspect of the present invention electrically conductive nano materials are included in addition to the conductive bridges in order to increase conductance through the resin layer.

Surprisingly, it has been found that use of conducting particles in a polymeric resin of a prepreg forms conductive bridges across the non-conductive resin interleafs or layers to provide reduced bulk resistivity, thereby improving z directional electrical conductivity through the composite material. Additionally, it has been found that the conducting particles dispersed in the resin formulation, and subsequently prepregged, result in a prepreg having substantially similar handling characteristics in comparison with an equivalent unmodified prepreg.

The above described and many other features and attendant advantages of the present invention will become better understood by reference to the following detailed description when taken in conjunction with the accompanying drawings.

DETAILED DESCRIPTION OF THE INVENTION

Figure 1:
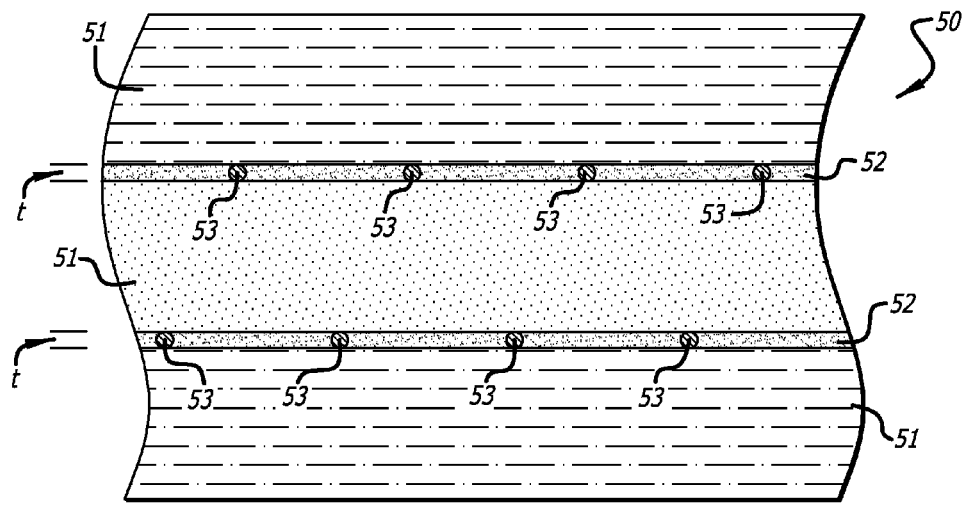
FIG. 1 is a simplified representation of a cross-sectional view (photomicrograph) of a laminate made according to Example 17 wherein 20 in silver-coated solid glass spheres form conductive bridges that extend across the resin interleave layers and electrically connect adjacent layers of carbon fibres in accordance with the present invention.

It is understood that references to a composite material include materials which comprise a fibre reinforcement, where the polymeric resin is in contact with the fibre but not impregnated in the fibre. The term composite material also includes an alternative arrangement in which the resin is partially embedded or partially impregnated in the fibre, commonly known in the art as prepreg. The prepreg may also have a fully impregnated fibrous reinforcement layer. The composite material may also include multilayered materials which have multiple fibre-resin-fibre layers.

It is understood that references to "interleaf structure" refers to the multi-layered material having a fibre-resin-fibre structure. The term "interleaf" refers to the polymeric resin layer which is present, and interleaved, between the fibre layers. References to "interleaf thickness" or "polymeric resin layer thickness" are to the average distance across the interleaf layer as measured from the uppermost surface of a lower or first fibre ply to a lowermost surface of an upper or second fibre ply. The interleaf thickness is therefore equivalent to the thickness of the interleaved polymeric resin layer, and references to interleaf thickness and polymeric resin layer thickness are interchangeable.

The terms interlayer, interleaf resin layer, resin layer, interplay resin layer, and fibre free layer as used herein are all interchangeable, and refer to the polymeric resin layer.

The term polymeric resin as used herein refers to a polymeric system. The term "polymeric resin" and "polymeric system" are used interchangeably in the present application, and are understood to refer to mixtures of polymers having varying chain lengths. The term polymeric therefore includes an embodiment where the resins present are in the form of a resin mixture comprising any of monomers, dimers, trimers, or prepolymers having chain length greater than 3 monomers. The resulting polymeric resin when cured forms a cross-linked matrix of resin.

Bulk resistivity refers to the measurement of the "bulk" of "volume" resistivity of a semi-conductive material. It can be seen that reference to an "initial bulk resistivity" relates to the bulk resistivity of a polymeric resin prior to addition of conducting particles. The value in Ohms-m is the inherent resistance of a given material. Ohms-m (Ωm) is used for measuring the conductivity of a three dimensional material. The bulk electrical resistivity ρ of a material is usually defined by the following:

$$\rho = \frac{RA}{l}$$

where:
ρ is the static resistivity (measured in ohm metres).
R is the electrical resistance of a uniform specimen of the material (measured in others),
l is the length of the specimen (measured in metres)
A is the cross-sectional area of the specimen (measured in square metres)

In the present invention, the volume resistivity is only measured in the z-direction (through the composite material thickness). In every case it is referenced as the "volume" resistivity as the thickness is always taken into consideration in the calculation.

As demonstrated in Comparative Examples 1-5, incorporation of electrically conductive particles into a non-conductive polymeric resin at concentrations of below 20 vol. % has little effect on the electrical resistance of the resin. However, as demonstrated in Comparative Example 6 and Examples 7-15, the same concentration of electrically conductive particles, when located in the resin interleaf layer, provide a large decrease in the bulk resistance of the composite material. This surprising decrease in bulk resistance is believed to be due to the electrically conductive particles becoming oriented in the interleaf layer so as to function as conductive bridges between the fibre layers. The particles do not function as conductive bridges when they are randomly oriented and distributed in the resin alone.

Furthermore, it has been found that addition of conductive nano materials in the interleaf layer provides an additional reduction in resistance that is believed to be due to the nano materials forming interconnections between the various conductive bridges that are formed by the conducting particles. The addition of conducting particles, such as carbon particles or silver coated glass spheres, to the composite material reduces bulk resistivity and therefore provides electrical conductance levels which exceed those that might have been reasonably expected.

A further benefit of the invention is an improved thermal conductivity for the prepreg, leading to faster heat up times and better dissipation of the heat generated during the cure exotherm. A still further benefit is that the electrical resistance of the composite material is essentially unchanged with variation in temperature.

The reduction in bulk resistivity and improvement in conductivity results in improved lightning strike performance. This improvement achieved by the present invention is therefore surprising in view of the low levels of electrically conductive particles employed, and the high electrical resistivity normally exhibited by the interleaf resin itself.

It is envisaged that the terms "resistivity" and "conductivity" used herein refer to electrical resistivity and electrical conductivity, respectively.

As used herein, the term "particles" refers to discrete three dimensional shaped additives which are distinct, treated as an individual units, and separable from other individual additives, but this does not preclude additives from being in contact with one another. The term embraces the shapes and sizes of electrically conductive particles described and defined herein.

The term "aspect ratio" used herein is understood to refer to the ratio of the longest dimension to the shortest dimension of a three dimensional body. The term is applicable to additives of any shape and size as used herein. Where the term is used in relation to spherical or substantially spherical bodies, the relevant ratio would be that of the largest cross sectional diameter with the smallest cross sectional diameter of the spherical body. It will therefore be understood that a perfect sphere would have an aspect ratio of 1 (1:1). The aspect ratios as specified herein for electrically conductive particles are based on the dimensions of the particles after any metal coating has been applied.

References to the size of the electrically conductive particles are to the largest cross sectional diameter or dimension of the particles.

Suitable electrically conductive particles may include, by way of example, spheres, microspheres, dendrites, beads, powders, any other suitable three-dimensional additives, or any combination thereof.

The conductive particles used in the present invention may comprise any suitable conducting particles that are capable of being oriented within the interleaf resin thickness so as to form conductive bridges. It will be understood that this would include any suitable conductive particles capable of reducing bulk resistivity and thereby facilitating electrical conductivity of the composite material.

The electrically conductive particles may be selected from metal coated conducting particles, non-metallic conducting particles, or a combination thereof.

The conductive particles are dispersed in the polymeric resin. It is envisaged that the term "dispersed" may include where the conductive particles are present substantially throughout the polymeric resin without being present in a substantially higher concentration in any part of the polymeric resin. Additionally, the term "dispersed" also includes the conductive particles being present in localised areas of polymeric resin if reduced bulk resistivity is only required in specific areas of the composite material.

The metal coated conducting particles may comprise core particles which are substantially covered by a suitable metal.

The core particles may be any suitable particles. Suitable particles, by way of example, include those formed from polymer, rubber, ceramic, glass, mineral, or refractory products such as fly ash.

The polymer may be any suitable polymer which is a thermoplastic or thermosetting polymer. The terms 'thermoplastic polymer' and 'thermosetting polymer' are as characterised herein.

The core particles formed from glass may be any of the types used for making solid or hollow glass microspheres.

Examples of suitable silica containing glass particles include soda glass, borosilicate, and quartz. Alternatively, the glass may be substantially silica free. Suitable silica free glasses include, by way of example, chalcogenide glasses.

The core particles may be porous or hollow or may themselves be a core-shell structure, for example core-shell polymer particles. The core particles may be first coated with an activating layer, adhesion promoting layer, primer layer, semi-conducting layer or other layer prior to being metal coated.

The core particles are preferably hollow particles formed from glass. Use of hollow core particles formed from glass may be advantageous in applications where weight reduction is of particular importance.

Mixtures of the core particles may be used to obtain, for example, lower densities or other useful properties, for instance a proportion of hollow metal coated glass particles may be used with a proportion of metal coated rubber particles to obtain a toughened layer with a lower specific gravity.

Metals suitable for coating the core particles include, by way of example, silver, gold, nickel, copper, tin, aluminium, platinum, palladium, and any other metals known to possess high electrical conductivity.

Multiple layers of metal coatings may be used to coat the core particles, for example gold coated copper, or silver coated copper. Simultaneous deposition of metals is also possible, thereby producing mixed metal coatings.

The metal coating may be carried out by any of the means known for coating particles. Examples of suitable coating processes include chemical vapour deposition, sputtering, electroplating, or electroless deposition.

The metal may be present as bulk metal, porous metal, columnar, microcrystalline, fibrillar, dendritic, or any of the forms known in metal coating. The metal coating may be smooth, or may comprise surface irregularities such as fibrils, or bumps so as to increase the specific surface area and improve interfacial bonding. However, the surface must be sufficiently regular to provide a solid electrical connection with the fibrous layer.

The metal coating may be subsequently treated with any of the agents known in the art for improving interfacial bonding with the polymeric resin, for example silanes, titanates, and zirconates.

The electrical resistivity of the metal coating should be preferably less than $3\times10^{-5}$ Ωm, more preferably less than $1\times10^{-7}$ Ωm, and most preferably less than $3\times10^{-8}$ Ωm.

The metal coated conducting particles may be of any suitable shape for example spherical, ellipsoidal, spheroidal, discoidal, dendritic, rods, discs, acicular, cuboid or polyhedral. Finely chopped or milled fibres may also be used, such as metal coated milled glass fibres. The particles may have well defined geometries or may be irregular in shape.

The metal coated conducting particles should possess an aspect ratio of less than 100, preferably less than 10, and most preferably less than 2.

The metal coated conducting particle size distribution may be monodisperse or polydisperse. Preferably, at least 90% of the metal coated particles have a size within the range 0.3 μm to 100 μm, more preferably 1 μm to 50 μm, and most preferably between 5 μm and 40 μm.

The electrically conductive particles may be non-metallic conducting particles. It will be understood that this would include any suitable non-metallic particles not having a metal coating, and capable of reducing bulk resistivity and thereby facilitating electrical conductivity of the composite material.

Suitable non-metallic coducting particles include, by way of example, graphite flakes, graphite powders, graphite particles, graphene sheets, fullerenes, carbon black, intrinsically conducting polymers (ICPs), including, polypyrrole, polythiophene, and polyaniline), charge transfer complexes, or any combination thereof.

An example of a suitable combination of non-metallic conducting particles includes combinations of ICPs with carbon black and graphite particles.

The non-metallic conducting particle size distribution may be monodisperse or polydisperse. Preferably, at least 90% of the non-metallic conducting particles have a size be within the range 0.3 µm to 100 µm, more preferably 1 µm to 50 µm, and most preferably between 5 µm and 40 µm.

The electrically conductive particles have a size whereby at least 50% of the particles present in the polymeric resin have a size within 10 µm of the thickness of the polymeric resin layer. In other words the difference between the thickness of the resin layer and the size of the electrically conductive articles is less than 10 µm. Preferably the electrically conductive particles have a size whereby at least 50% of the particles present in the polymeric resin have a size within 5 µm of the thickness of the polymeric resin layer.

The size of at least 50% of the electrically conductive particles is therefore such that they bridge across the interleaf thickness (polymeric resin layer), and the particles are in contact with an upper fibrous reinforcement ply and a lower fibrous reinforcement ply arranged about the polymeric resin layer.

The electrically conductive particles may be present in the range 0.2 vol. % to 20 vol. % of the composite material. More preferably, the conducting particles are present in the range 0.4 vol. % to 15 vol. %. Most preferably, the conducting particles are present in the range 0.8 vol. % to 10 vol. %.

In an alternative einbodiment, electrically conductive nano materials may be present in an amount of less than 10 vol. % of the polymeric resin layer to provide supplemental electrical conductivity through the resin layer.

It can be seen that the preferred ranges of the electrically conductive particles are expressed in vol. % as the weight of the particles may exhibit a large variation due to variation in densities.

The electrically conductive particles may be used alone or in any suitable combination.

Without wishing to be unduly bound by theory, it has been found that the benefits of the invention may be conferred due to the conductive particles (either metal coated or non-metallic) acting as electrical conductance bridges across the interleaf thickness (i.e. across the polymeric resin layer and between the layers of fibrous reinforcement), thereby connecting plies of fibrous reinforcement and improving the z directional electrical conductance.

The conductive bridges that are formed when the size of the electrically conductive particles is substantially equal to the interleaf thickness advantageously allows for electrical conductance across the composite material (in the z plane) to be provided at relatively low loading levels of conductive particles. As previously mentioned, these low loading levels of electrically conductive particles are less than would be typically required to make the polymeric resin itself electrically conducting.

The electrically conductive particles therefore facilitate electrical conductivity by lowering the bulk resistivity of the composite material.

The nano materials used in the above mentioned alternate embodiment may comprise carbon nano materials. The carbon nano materials may be selected from carbon nanotubes, and carbon nanofibres. The carbon nano materials may be any suitable carbon nanotubes or carbon nanofibres.

The carbon nano materials may have a diameter in the range 10-500 nm. Preferred carbon nano materials may have a diameter in the range 100 to 150 nm. The carbon nano materials may preferably have a length in the range 1-10 µm.

The carbon nano materials provide additional electrically conducting pathways through the composite material (in the x,y and z planes) by further bridging between the conductive particles and across the interleaf.

The fibrous reinforcements are arranged in the form of layers or plies comprising a number of fibre strands. The composite material comprises at least two fibrous reinforcement plies which are arranged either side of a polymeric resin layer. As well as providing electrical conductivity in the x and y planes of the material, the plies act as supporting layers to the structure of the material, and substantially contain the polymeric resin.

The fibrous reinforcement of the prepreg may be selected from hybrid or mixed fibre systems which comprise synthetic or natural fibres, or a combination thereof. The fibrous reinforcement is electrically conductive, and therefore is formed from fibres which are electrically conductive.

The fibrous reinforcement may preferably be selected from any suitable material such as metallised glass, carbon, graphite, metallised polymer fibres (with continuous or discontinuous metal layers), the polymer of which may be soluble or insoluble in the polymeric resin. Any combination of these fibres may be selected. Mixtures of these fibres with non-conducting fibres (such as fibreglass for example) may also be used.

The fibrous reinforcement is most preferably formed substantially from carbon fibres.

The fibrous reinforcement may comprise cracked (i.e. stretch-broken) or selectively discontinuous fibres, or continuous fibres. It is envisaged that use of cracked or selectively discontinuous fibres may facilitate lay-up of the cured composite material prior to being fully cured according to the invention, and improve its capability of being shaped.

The fibrous reinforcement may be in the form of woven, non-crimped, non-woven, unidirectional, or multiaxial textile tapes or tows.

The woven form is preferably selected from a plain, satin, or twill weave style. The non-crimped and multiaxial forms may have a number of plies and fibre orientations.

Such styles and forms of fibrous reinforcement are well known in the composite reinforcement field, and are commercially available from a number of companies including Hexcel Reinforcements of Villeurbanne, France.

The polymeric resin of the prepreg preferably comprises at least one thermoset or thermoplastic resin.

The term 'thermoset resin' includes any suitable material which is plastic and usually liquid, powder, or malleable prior to curing and designed to be moulded in to a final form. The thermoset resin may be any suitable thermoset resin. Once cured, a thermoset resin is not suitable for melting and remoulding. Suitable thermoset resin materials for the present invention include, but are not limited to, resins of phenol formaldehyde, urea-formaldehyde, 1,3,5-triazine-2,4,6-triamine (Melamine), bismaleimide, epoxy resins, vinyl ester resins, benzoxazine resins, phenolic resins, polyesters, unsaturated polyesters, cyanate ester resins, or any combination thereof.

The thermoset resin is preferably selected from epoxide resins, cyanate ester resins, bismaleimide, vinyl ester, benzoxazine, and phenolic resins.

The term 'thermoplastic resin' includes any suitable material which is plastic or deformable, melts to a liquid when heated and freezes to a brittle, and forms a glassy state when cooled sufficiently. Once formed and cured, a thermoplastic resin is suitable for melting and re-moulding. Suitable thermoplastic polymers for use with the present invention include any of the following either alone or in combination: polyether sulphone (PES), polyether ethersulphone (PEES), polyphenyl sulphone, polysulphone, polyester, polymerisable macrocycles (e.g. cyclic butylene terephthalate), liquid crystal polymers, polyimide, polyetherimide, aramid, polyamide, polyester, polyketone, polyetheretherketone (PEEK), polyurethane, polyurea, polyarylether, polyarylsulphides, polycarbonates, polyphenylene oxide (PPO) and modified PPO, or any combination thereof.

The polymeric epoxy resin preferably comprises at least one of bisphenol-A (BPA) diglycidyl ether and bisphenol-F (BPF) diglycidyl ether and derivatives thereof; tetraglycidyl derivative of 4,4'-diaminodiphenylmethane (TGDDM); triglycidyl derivative of aminophenols, and other glycidyl ethers and glycidyl amines well known in the art.

The polymeric resin is applied to the fibrous reinforcement. The fibrous reinforcement may be fully or partially impregnated by the polymeric resin. In an alternative embodiment, the polymeric resin may be a separate layer which is proximal to, and in contact with, the fibrous reinforcement, but does not substantially impregnate said fibrous reinforcement.

The composite material may include at least one curing agent. The curing agent may be substantially present in the polymeric resin. It is envisaged that the term "substantially present" means at least 90 wt. % of the curing agent, preferably 95 wt. % of the curing agent.

For epoxy resins, the curing agents of the invention are those which facilitate the curing of the epoxy-functional compounds of the invention, and, particularly, facilitate the ring opening polymerisation of such epoxy compounds. In a particularly preferred embodiment, such curing agents include those compounds which polymerise with the epoxy-functional compound or compounds, in the ring opening polymerisation thereof.

Two or more such curing agents may be used in combination.

Suitable curing agents include anhydrides, particularly polycarboxylic anhydrides, such as nadic anhydride (NA), methylnadic anhydride, phthalic anhydride, tetrahydrophthalic anhydride, hexahydrophthalic anhydride, methyltetrahydrophthalic anhydride, methylhexahydrophthalic anhydride, endomethylenetetrahydrophthalic anhydride, or trimellitic anhydride.

Further suitable curing agents are the amines, including aromatic amines, e.g., 1,3-diaminobenzene, 1,4-diaminobenzene, 4,4'-diaminodiphenylmethane, and the polyaminosulphones, such as 4,4'-diaminodiphenyl sulphone (4,4-DDS), and 3,3'-diaminodiphenyl sulphone (3,3'-DDS).

Also, suitable curing agents may include phenol-formaldehyde resins, such as the phenol-formaldehyde resin having an average molecular weight of about 550-650, the p-t-butylphenol-formaldehyde resin having an average molecular weight of about 600-700, and the p-n-octylphenol-formaldehyde resin, having an average molecular weight of about 1200-1400.

Yet further suitable resins containing phenolic groups can be used, such as resorcinol based resins, and resins formed by cationic polymerisation, such as dicyclopentadiene-phenol copolymers. Still additional suitable resins are melamine-formaldehyde resins, and urea-formaldehyde resins.

Different commercially available compositions may be used as curing agents in the present invention. One such composition is AH-154, a dicyandiamide type formulation, available from Ajinomoto USA Inc. Others which are suitable include Ancamide 1284, which is a mixture of 4,4'-methylenediamine and 1,3-benzenediamine; these formulations are available from Pacific Anchor Chemical, Performance Chemical Division, Air Products and Chemicals, Inc., Allentown, USA.

The curing agent(s) is selected such that it provides curing of the resin component of the composite material when combined therewith at suitable temperatures. The amount of curing agent required to provide adequate curing of the resin component will vary depending upon a number of factors including the type of resin being cured, the desired curing temperature, and the curing time. Curing agents typically include cyanoguanidine, aromatic and aliphatic amines, acid anhydrides, Lewis Acids, substituted ureas, imidazoles and hydrazines. The particular amount of curing agent required for each particular situation may be determined by well-established routine experimentation.

Exemplary preferred curing agents include 4,4'-diaminodiphenyl sulphone (4,4-DDS) and 3,3'-diaminodiphenyl sulphone (3,3'-DDS).

The curing agent, if present, may be present in the range 45 wt. % to 2 wt. % of the composite material. More preferably, the curing agent may be present in the range 30 wt. % to 5 wt. %. Most preferably, the curing agent may be present in the range 2.5 wt. % to 5 wt. %.

Accelerators, if present, are typically urones. Suitable accelerators, which may be used alone or in combination include N,N-dimethyl, N-3,4-dichlorphenyl urea (Diuron), N'-3-chlorophenyl urea (Monuron), and preferably N,N-(4-methyl-m-phenylene bis[N',N'-dimethylurea] (TDI urone).

The composite material may also include additional ingredients such as performance enhancing or modifying agents. The performance enhancing or modifying agents, by way of example, may be selected from flexibilisers, toughening agents/particles, additional accelerators, core shell rubbers, flame retardants, wetting agents, pigments/dyes, flame retardants, plasticisers, UV absorbers, anti-fungal compounds, fillers, viscosity modifiers/flow control agents, tackifiers, stabilisers, and inhibitors.

Toughening agents/particles may include, by way of example, any of the following either alone or in combination: polyamides, copolyamides, polyimides, aramids, polyketones, polyetheretherketones, polyarylene ethers, polyesters, polyurethanes, polysulphones, high performance hydrocarbon polymers, liquid crystal polymers, PTFE, elastomers, and segmented elastomers.

Toughening agents/particles, if present, may be present in the range 45 wt. % to 0 wt. % of the composite material. More preferably, they may be present in the range 25 wt. % to 5 wt. %. Most preferably, they may be present in the range 15 wt. % to 10 wt. %.

A suitable toughening agent/particle, by way of example, is Sumikaexcel 5003P, which is commercially available from Sumitomo Chemicals of Tokyo, Japan. Alternatives to 5003P are Solvay polysulphone 105P, and Solvay 104P which are commercially available from Solvay of Brussels, Belgium.

Suitable fillers may include, by way of example, any of the following either alone or in combination: silicas, aluminas, titania, glass, calcium carbonate, and calcium oxide.

The composite material may comprise an additional polymeric resin which is at least one thermoset or thermoplastic resins as defined previously.

Whilst it is desirable that the majority of electrically conductive particles are located within the polymeric resin of the composite material, it is not generally detrimental if a small percentage of such particles are distributed within the fibrous reinforcement. The conducting particles may be suitably dispersed within the polymeric resin of the prepreg by conventional mixing or blending operations.

The mixed resin containing all the necessary additives and the conducting particles can be incorporated into prepreg by any of the known methods, for example a so-called lacquer process, resin film process, extrusion, spraying, printing or other known methods.

In a lacquer process all the resin components are dissolved or dispersed in a solvent and the fibrous reinforcement is dipped in the solvent, and the solvent is then removed by heat. In a resin film process the polymeric resin is cast as a continuous film, either from a lacquer or a hot melt resin, onto a substrate which has been treated with a release agent, and then the coated film is contacted against the fibrous reinforcement and, under the aid of heat and pressure, the resin film melts and flows into the fibres. A multiplicity of films may be used and one or both sides of the fibre layer may be impregnated in this way.

If the prepreg is made by a film or lacquer process, the majority of the conducting particles will be "filtered" by the reinforcing fibres and thus will be substantially prevented from entering the fibrous reinforcement because the particle size is larger than the distance between the reinforcing fibres. Accordingly, the particles become concentrated in the interleaf layer where they act as individual spacers or bridges between the fibrous layers. Other processes, such as spraying or printing would enable the conducting particles to be placed directly onto the fibrous reinforcement with very low penetration of the said particles between the fibres.

When metal coated hollow particles are used, it may be necessary to utilise lower shear mixing equipment to reduce the deforming effect that mixing may produce on the conducting particles.

The prepreg may be in the form of continuous tapes, towpregs, fabrics, webs, or chopped lengths of tapes, towpregs, fabrics, or webs. The prepreg may be an adhesive or surfacing film, and may additionally have embedded carriers in various forms both woven, knitted, and non-woven.

Prepregs formulated according to the present invention may be fabricated into final components using any of the known methods, for example manual lay-up, automated tape lay-up (ATL), automated fibre placement, vacuum bagging, autoclave cure, out of autoclave cure, fluid assisted processing, pressure assisted processes, matched mould processes, simple press cure, press-clave cure, or continuous band pressing.

The composite material may be in an embodiment comprising a single ply of conductive fibrous reinforcement, which has applied on one side a polymeric resin layer comprising electrically conductive particles. The composite material may be manufactured in a single ply embodiment and subsequently be formed in to multiple layers to provide an interleaf structure by lay-up. The interleaf structure is therefore formed during lay-up where a fibre-resin-fibre configuration arises.

The composite material may therefore comprise a single prepreg. Alternatively, the composite material may comprise a plurality of prepregs.

The polymeric resin layer thickness of the prepreg is preferably in the range 1 µm to 100 µm, more preferably 1 µm to 50 µm, and most preferably 5 µm to 50 µm.

Multiple layers of conductive composite materials may be used. Thus, by way of example, an assembly may be prepared using 12 plies of standard composite materials, and 4 plies of composite materials comprising conducting particles of the present invention, thus enhancing the conductivity of the final assembly. As a further example, a laminate assembly could be prepared from 12 plies of standard composite materials, and composite material comprising conducting particles and with no carbon fibre reinforcement. Optionally, where a composite material of the present invention is used, an electrically isolating layer can be placed between the carbon fibre plies and the resin surface. For example, a glass reinforced fibrous layer can be used as the isolating layer. It is understood that there are many possible assemblies that could be used, and those described herein are by way of example only.

A further benefit is that the composite material of the present invention, prior to being fully cured, is completely flexible and is suitable for automated tape lay up processes which are increasingly used in the manufacture of large composite structures in the aerospace industry.

The composite material of the invention may be fully or partially cured using any suitable temperature, pressure, and time conditions known in the art.

The composite material may be cured using a method selected from UV-visible radiation, microwave radiation, electron beam, gamma radiation, or other suitable thermal or non-thermal radiation.

Thus, according to a fourth aspect of the present invention there is provided a method of making a cured composite material comprising the steps of the second aspect, and subsequently curing the composite material.

The curing step of the fourth aspect may be using any known method. Particularly preferred are curing methods as described herein.

Thus according to a fifth aspect of the present invention there is provided a cured composite material which comprises a composite material according to the first aspect of the present invention, wherein the composite material is cured.

Whilst most of the following discussion concentrates on lightning strike protection, it will readily be seen that there are many potential applications for a composite material exhibiting reduced bulk resistivity and high electrical conductivity. Thus, the level of conductivity achieved by the present invention will make the resulting composite materials suitable for use in electromagnetic shielding, electrostatic protection, current return, and other applications where enhanced electrical conductivity is necessary.

Furthermore, although much of the discussion centres around aerospace components, it is also possible to apply the present invention to lightning strike and other electrical management problems in wind turbines, buildings, marine craft, trains, automobiles and other areas of concern.

It is envisaged that the present invention, when used for aerospace components, can be used for primary structure applications (i.e. those parts of the structure which are critical for maintaining the integrity of the airplane), as well as secondary structure applications.

Thus, according to a sixth aspect of the present invention there is provided a process for making an aerospace article formed from a cured composite material comprising the steps of:

making a cured composite material in accordance with the method of the fourth aspect using the cured composite material to produce an aerospace article by a known method.

Thus, according to a seventh aspect of the present invention there is provided an aerospace article comprising the cured composite material of the fifth aspect.

All of the features described herein may be combined with any of the above aspects, in any combination.

In the following examples, "neat resin" refers to the basic polymeric matrix resin, in the absence of reinforcing fibres, used for manufacturing prepreg.

M21 is a thermoplastic-toughened epoxy resin that is used in the production of HexPly® M21. M21 includes a mixture of bifunctional, trifunctional and tetrafunctional epoxies that is toughened with a thermoplastic toughening agent. HexPly® M21 is an interleaved prepreg material available from Hexcel Composites, Duxford, Cambridge, United Kingdom.

LY1556 is an epoxy resin available from Huntsman Advanced Materials, Duxford, Cambridge, United Kingdom.

It will be understood that all tests and physical properties listed have been determined at atmospheric pressure and room temperature (i.e. 20° C.), unless otherwise stated herein, or unless otherwise stated in the referenced test methods and procedures.

Comparative Example 1

Neat Resin

A neat epoxy resin sample of M21 was produced by blending the epoxy resins, curing agent and toughening agent uniformly and curing in a thermostatically controlled oven at 180° C. for 2 hours. Surface resistivity was then measured for the cured resin plaque using a model 272 resistivity meter from Monroe Electronics by placing a circular electrode on the surface of the neat resin specimen a reading the measured and displayed value on the instrument panel. It is important that contact between the specimen and probe is good, and therefore neat resin samples should be flat, smooth and uniform. Results are shown in Table 1.

Comparative Example 2

Neat Resin with Conductive Particles

Samples of resin (M21) comprising silver coated solid glass spheres (size 20 μm) present at the following levels:

2-1 1.0 vol. % (equivalent to 2.5 wt. %)
2-2 2.0 vol. % (equivalent to 5.0 wt. %)
2-3 3.0 vol. % (equivalent to 7.5 wt. %)
2-4 2-4 4.0 vol. % (equivalent to 10.0 wt. %)

were prepared and cured in an oven at 180° C. for 2 hours. Surface resistivity was then measured using the same resistivity meter and procedure as detailed in Example 1. Results are shown in Table 1.

Comparative Example 3

Neat Resin with Conductive Particles

Samples of resin (M21) comprising silver coated polymethylmethacrylate (PMMA) particles (size 20 μm) present at the following levels:

3-1 2.5 vol. % (equivalent to 2.5 wt. %)
3-2 5.0 vol. % (equivalent to 5.0 wt. %)
3-3 7.5 vol. % (equivalent to 7.5 wt. %)
3-4 10.0 vol. % (equivalent to 10.0 wt. %)

were prepared and cured in an oven at 180° C. for 2 hours. Surface resistivity was then measured using a resistivity meter and procedure as detailed in Comparative Example 1. Results are shown in Table 1.

Comparative Example 4

Neat Resin with Conductive Particles

Samples of M21 epoxy resin comprising silver coated hollow glass spheres (size 20 μm) present at the following levels:

4-1 2.5 vol. % (equivalent to 2.5 wt. %)
4-2 5.0 vol. % (equivalent to 5.0 wt. %)
4-3 7.5 vol. % (equivalent to 7.5 wt. %)
4-4 10.0 vol. % (equivalent to 10.0 wt. %)

were prepared and cured in an oven at 180° C. for 2 hours. Surface resistivity was then measured using a resistivity meter and procedure detailed in Comparative Example 1. Results are shown in Table 1.

The surface resistivity is a measure of resistivity of thin films having uniform thickness. Surface resistivity is measured in ohms/square ($\Omega$/sq.), and it is equivalent to resistivity for two-dimensional systems. The term is therefore a measure of resistivity for a current passing along the surface, rather than through the material which is expressed as bulk resistivity. Surface resistivity is also referred to as sheet resistance.

TABLE 1

Surface resistivity of M21 epoxy resin modified with conductive particles.

| Example | Conductive additive | Loading (vol. %) | Loading (wt. %) | Surface Resistivity ($\Omega$/square) |
|---|---|---|---|---|
| 1 | No additive | 0 | 0 | $2.0 \times 10^{12}$ |
| 2-1 | Silver coated solid glass spheres | 1.0 | 2.5 | $3.4 \times 10^{12}$ |
| 2-2 | Silver coated solid glass spheres | 2.0 | 5.0 | $3.0 \times 10^{12}$ |
| 2-3 | Silver coated solid glass spheres | 3.0 | 7.5 | $2.5 \times 10^{12}$ |
| 2-4 | Silver coated solid glass spheres | 4.0 | 10.0 | $2.6 \times 10^{12}$ |
| 3-1 | Silver coated PMMA spheres | 2.5 | 2.5 | $2.4 \times 10^{12}$ |
| 3-2 | Silver coated PMMA spheres | 5.0 | 5.0 | $3.0 \times 10^{12}$ |
| 3-3 | Silver coated PMMA spheres | 7.5 | 7.5 | $1.8 \times 10^{12}$ |
| 3-4 | Silver coated PMMA spheres | 10.0 | 10.0 | $1.7 \times 10^{12}$ |
| 4-1 | Silver coated hollow glass spheres | 2.5 | 2.5 | $2.7 \times 10^{12}$ |
| 4-2 | Silver coated hollow glass spheres | 5.0 | 5.0 | $2.8 \times 10^{12}$ |
| 4-3 | Silver coated hollow glass spheres | 7.5 | 7.5 | $1.8 \times 10^{12}$ |
| 4-4 | Silver coated hollow glass spheres | 10.0 | 10.0 | $1.9 \times 10^{12}$ |

These results demonstrate that addition of conductive silver particles at 10 vol. % or lower provides little, if any, reduction in the surface resistivity of cured neat epoxy resin. The epoxy resin remains essentially non-electrically conductive (at least $1 \times 10^{12}$ $\Omega$/square) even though conducting particles have been added.

Comparative Example 5

Neat Resin with Carbon Nano Fibres

A neat epoxy resin sample was produced in which LY1556 (50.0 g) was added carbon nanofibres (110 nm-150 nm diameter having lengths of 1-10 μm) as produced by Electrovac of Austria. Using a Flaktec Speedmixer the fibres were dispersed in the resin at 2500 rpm for 15 minutes. Silver coated glass beads (20 μm) at 2.0 vol. %, carbon nanofibres at 2.0 wt. %, and 4,4'-diaminodiphenylsulphone were added to the mixture and blended by stirring. The resistivity of neat LY1556 resin is about $10^{12}$ Ω/square. The formulation was cured in a thermostatically controlled oven at 180° C. for 2 hours. Surface resistivity was then measured for the cured plaque using a model 272 resistivity meter from Monroe Electronics. Results are summarised in Table 2.

TABLE 2

Surface resistivity of epoxy resin modified with silver coated glass spheres and carbon nanofibres (CNF).

| Example | 110 nm CNFs (wt. %) | Silver solid glass spheres (vol. %) | Silver coated glass spheres (wt. %) | Surface Resistivity (Ω/square) |
|---|---|---|---|---|
| 1 | — | — | — | $2 \times 10^{12}$ |
| 2-2 | — | 2.0 | 5.0 | $3.0 \times 10^{12}$ |
| 5 | 2 | 2.0 | 5.0 | $4.7 \times 10^{2}$ |

These results show that the combination of carbon nanofibres with silver coated glass spheres lowers the surface resistivity of the epoxy resin when compared to the neat epoxy resin and epoxy resin that contains silver coated solid glass spheres.

In the following examples, "carbon composite" refers to the basic matrix resin, in the presence of reinforcing carbon fibres, used for manufacturing prepreg.

Comparative Example 6

Carbon Composite

M21 resin was produced by blending the components in a Z-blade mixer (Winkworth Machinery Ltd, Reading, England). The resin was coated as a thin film on silicone release paper which was then impregnated on intermediate modulus IM7 unidirectionally oriented carbon fibre available from (Hexcel Composites, Duxford, UK) at a resin weight of 35% using a hot press to make a unidirectional prepreg. A five ply prepreg was laid up unidirectionally which was approximately 10 cm by 10 cm and cured on a vacuum table at a pressure of 7 bar at 177° C. for 2 hours. A z-direction electrical resistance value of the composite was determined first by gold sputtering a square on either side of a rectangular shaped sample in order to ensure low contact resistance. Resistivity was then measured by applying probes to the gold sputtered area of the specimens and using a power source (TTi EL302P Programmable 30V/2A Power Supply Unit, Thurlby Thandar Instniments, Cambridge, UK) that was capable of varying either voltage or current.

Example 7

Carbon Composite with Conductive Particles

M21 resin was modified with silver coated solid glass spheres (20 μm) at a range of 0.8-2.4 vol. % of the resin and the components were blended in a Winkworth mixer. The resin was coated as a thin film on silicone release paper and was then impregnated on intermediate modulus IM7 carbon fibre at a resin weight of 35% using a hot press to make a unidirectional prepreg. A five ply prepreg of approximately 10 cm by 10 cm was laid up unidirectionally and cured on a vacuum table at a pressure of 7 bar at 177° C. for 2 hours. A z-direction electrical resistance value was determined according to the method of Example 1. Results are summarised in Table 3.

TABLE 3

Volume resistivity of carbon composite modified with silver coated glass spheres.

| Example | Silver coated glass spheres (vol. %) | Silver coated glass spheres (wt. %) | Z-direction volume resistivity (Ωm) |
|---|---|---|---|
| 6 | — | — | 3.66 |
| 7-1 | 0.8 | 2 | 2.13 |
| 7-2 | 1.6 | 4 | 1.89 |
| 7-3 | 2.4 | 6 | 1.75 |

The results in Table 3 clearly show a decrease in z-direction volume resistivity when compared to a neat resin material of Example 6. The resistivity is further reduced when the amount of silver coated glass spheres is increased in the material.

Example 8

Carbon Composite with Conductive Particles

M21 resin was modified with silver coated hollow glass spheres (20 μm) at a range of 2.5-10.0 vol. % of the resin, and the components were blended in a Winkworth mixer. The resin was coated as a thin film on silicone release paper and was then impregnated on intermediate modulus IM7 carbon fibre at a resin weight of 35% using a hot press to make a unidirectional prepreg. A five ply prepreg of approximately 10 cm by 10 cm was laid up unidirectionally and cured on a vacuum table at a pressure of 7 bar at 177° C. for 2 hours. A z-direction electrical resistance value was determined according to the method of Example 6. Results are summarised in Table 4.

TABLE 4

Volume resistivity of carbon composite modified with silver coated hollow glass spheres according to Example 8.

| Example | Silver coated hollow glass spheres (vol. %) | Silver coated hollow glass spheres (wt. %) | Z-direction volume resistivity (Ωm) |
|---|---|---|---|
| 8-1 | 2.5 | 2.5 | 0.116 |
| 8-2 | 5.0 | 5.0 | 0.064 |
| 8-3 | 7.5 | 7.5 | 0.032 |
| 8-4 | 10.0 | 10.0 | 0.019 |

The results in Table 4 clearly show a decrease in z-direction volume resistivity. The resistivity is further reduced with increases in the amount of silver coated hollow glass spheres in the material.

Example 9

Carbon Composite with Conductive Particles

M21 resin was modified with silver coated polymethylmethacrylate particles 20 μm) at a range of 2.5-10.0 vol. % of the resin. The resin was produced by blending the components in a Winkworth mixer. The resin was coated as a thin film on silicone release paper and was then impregnated on intermediate modulus IM7 carbon fibre at a resin weight of 35% using a hot press to make a unidirectional prepreg. A five ply prepreg of approximately 10 cm by 10 cm was laid up unidirectionally and cured on a vacuum table at a pressure of 7 bar at. 177° C. for 2 hours. A z-direction electrical resistance value was determined according to the method of Example 6. Results are summarised in Table 5.

TABLE 5

Volume resistivity of carbon composite modified with silver coated PMMA spheres.

| Example | Silver coated PMMA particles (vol. %) | Silver coated PMMA particles (wt. %) | Z-direction volume resistivity ($\Omega$m) |
|---|---|---|---|
| 9-1 | 7.5 | 2.5 | 0.567 |
| 9-2 | 5.0 | 5.0 | 0.103 |
| 9-3 | 7.5 | 7.5 | 0.110 |
| 9-4 | 10.0 | 10.0 | 0.052 |

The results in Table 5 clearly show a decrease in z-direction volume resistivity. The resistivity is further reduced with increases in the amount of silver coated glass spheres in the material.

Comparative Example 10

Carbon Composite with Dendritic Conductive Particles

M21 resin was modified with dendritic silver/copper (40 μm) at a loading of 0.30 vol. % of the resin. The resin was produced by blending the components in a Winkworth mixer. The resin was coated as a thin film on silicone release paper and was then impregnated on intermediate modulus IM7 carbon fibre at a resin weight of 35% using a hot press to make a unidirectional prepreg. A five ply prepreg of approximately 10 cm by 10 cm was laid up unidirectionally and cured on a vacuum table at a pressure of 7 bar at 177° C. for 2 hours. A z-direction electrical resistance value was determined according to the method of Example 6. Results are summarised in Table 6.

Example 11

Carbon Composite with Conductive Particles

M21 resin was modified with silver coated solid glass beads (100 μm) at a loading of 1.0 vol. % of the resin. A prepreg and composite was produced according to example 9. Z-direction electrical resistance value was determined as per Example 6. Results are summarised in Table 6.

Example 12

Carbon Composite

M21 resin was modified with silver coated glass fibres (10 μm diameter×190 μm long) at a loading of 1.25 wt. % of the resin. A prepreg and composite was produced according to example 9. Z-direction electrical resistance value W as determined as per Example 6. Results are summarised in Table 6.

TABLE 6

Volume resistivity of carbon composite modified with different conducting particles.

| Example | Conducting particle | Particles (vol. %) | Particles (wt. %) | Z-direction volume resistivity ($\Omega$m) |
|---|---|---|---|---|
| 10 | Dendritic silver/copper (40 μm) | 0.30 | 2.5 | 12.26 |
| 11 | Silver coated glass beads (100 μm) | 1.0 | 2.5 | 1.10 |
| 12 | Silver coated glass fibres (190 μm) | 1.25 | 2.5 | 2.89 |

The results in Table 6 show a decrease in z-direction volume resistivity when spherically shaped (aspect ratio of 1) conductive particles (100 μm) are used. In addition, when conductive particles (silver coated glass fibres) having a relatively high aspect ratio of 19 are used, the resistivity is only modestly reduced. According, a previously mentioned, the aspect ratios for conductive particles are preferably below 10 and more preferably below 2.

Comparative Example 13

Carbon Composite-Quasi-Isotropic Laminate

M21 prepreg was produced according to Example 12, except that the layers of unidirectional fibres were oriented in +45° to each other to form a 6 ply quasi-isotropic (QI) laminate of approximate size 10 cm×10 cm, which was cured on a vacuum table at a pressure of 7 bar at 177° C. for 2 hours. The glass transition temperature, $T_g$, of the QI composite was determined by dynamic thermal analysis from the storage modulus trace, E', to be 194.5° C., A square sample (3.9 cm×3.9 cm×0.16 cm) was cut from the cured panel and the z-direction resistivity measured as follows. To ensure good electrical contact, the appropriate parts of the composite were vacuum coated with gold in the vicinity where connection was to be made with the power supply. The resistivity was then determined by applying a current of 1 amp from the power supply and measuring the resulting voltage.

TABLE 7

Volume resistivity of the QI composite of Comparative Example 13.

| Direction | Lay up and size | Z-direction Volume Resistivity ($\Omega$m) |
|---|---|---|
| z | QI (3.9 cm × 3.9 cm × 0.16 cm) | 19.70 |

Example 14

QI Carbon Composite with Conductive Particles

M21 resin was modified with 20 μm silver coated glass beads at (2 vol. %, 5 wt. %) and prepreg was produced according to the method of Example 13. A 6 ply quasi-isotropic laminate of approximate size 10 cm×10 cm was prepared and cured on a vacuum table at a pressure of 7 bar at 177° C. for 2 hours. The glass transition temperature ($T_g$) of the composite was determined as for Comparative Example 13 to be 196.0° C. Thus the addition of the silver coated beads does not have a deleterious effect on the $T_g$. A square sample (3.8 cm×3.8 cm×0.16 cm) was cut from the cured panel and the z-direction resistivity measured as for Example 13. As shown in Table 8, resistivity was significantly improved.

TABLE 8

Volume resistivity of the composite of Example 14.

| Direction | Lay up and size | Z-direction Volume Resistivity ($\Omega$m) |
|---|---|---|
| z | QI (3.8 cm × 3.8 cm × 0.16 cm) | 0.024 |

Example 15

QI Carbon Composite with Conductive Particles and Nano Material

M21 resin was modified with 20 μm silver coated glass beads at (2 vol. %, 5 wt. %) and carbon nanofibres (150 nm diameter and lengths of 1-10 μm) at 2 wt. % of the resin. Prepreg was produced according to Comparative Example 13. A 12 ply quasi-isotropic laminate of approximate size 10 cm×10 cm was prepared and cured on a vacuum table at a pressure of 7 bar at 177° C. for 2 hours. The glass transition temperature ($T_g$) of the composite was determined as for Comparative Example 13 to be 196.5° C. Thus the addition of the silver coated beads has not had a deleterious effect on the $T_g$. A square sample was cut from the cured panel and the z-direction resistivity measured as for Comparative Example 13. As is shown in Table 9, resistivity is significantly reduced in comparison to the QI laminate without conductive particles and nano fibres.

TABLE 9

Volume resistivity of the composite of Example 15.

| Direction | Lay up and size | Z-direction Volume Resistivity ($\Omega$m) |
|---|---|---|
| z | QI (3.8 cm × 3.8 cm × 0.16 cm) | 0.023 |

Comparative Example 16

Simulated Lightning Strikes with no Conductive Particles

M21 resin was produced using a Winkworth mixer and then filmed onto silicone release paper. This resin film was then impregnated onto unidirectional intermediate modulus carbon fibre, using a pilot scale unidirectional prepregger, which produced a prepreg with an areal weight of 268 g/m² at 35 wt. % of resin. Two six-ply prepregs were produced (lay up±0/90) which were approximately 60 cm by 60 cm and these were cured on a vacuum table at a pressure of 7 bar at 177° C. for 2 hours.

The two panels were tested according to procedures established for Zone 1A surfaces, which include surfaces of the aeroplane for which there is a high probability of initial lightning flash attachment (entry or exit) with low probability of flash hang on, such as radomes and leading edges. Zone 1A also includes swept leaders attachment areas. The zone 1A test has three waveform components, high current component A ($2\times10^6$ A, <500 μs), intermediate current component B (average 2 kA, <5 ms) and continuing current component C (200C, <1 s). Both surfaces of the panels were abraded around the edges to ensure a good connection to the outer frame. The electrode was connected to the panel via a thin copper wire. The copper wire provides a path for the current and vaporises on test. It is needed as the voltage generated is not enough to break down the air.

After a simulated lightning strike, Each of the test panels, which did not comprise metal coated particles, showed severe damage on both the upper surface and lower surface.

An Ultrasonic c-scan was also performed. The Ultrasonic C-scan of the damaged panels was performed using an R/D Tech Omniscan MX from Olympus. The scan showed that the damage area for the unmodified panels was very large.

TABLE 10

Test parameters of lightning strike tests for Comparative Example 16.

| Panel No. | A Component Current, I (kA) | Action Integral, AI ($10^6A^2s$) | B Component current, I (kA) | C Component Charge, Q |
|---|---|---|---|---|
| 1 | 191.7 | 2.04 | 1.74 | 31.3 |
| 2 | 191.7 | 2.04 | 1.72 | 24.3 |

TABLE 11

Description of damaged area after lightning strike tests

| Panel No. | Description of Damage |
|---|---|
| 1 | Upper surface; delamination and dry fibres. Unusual scorch mark on surface. 330 mm × 250 mm Bottom surface; delamination and dry fibres. 420 mm × 230 mm. Hole through panel. |
| 2 | Upper surface; delamination and dry fibres. 280 mm × 270 mm. Bottom surface; delamination and dry fibres. 510 mm × 180 mm |

A large white area was observed on the c-scan. This is where the delamination of the panels had occurred after the simulated lightning strike test. This shows that the damaged area is large for panels that do not include metal coated particles.

Example 17

Simulated Lightning Strikes with Conductive Particles

M21 resin was modified with 20 μm silver coated glass spheres (2 vol. %, 5 wt. % of resin), blended using a Winkworth mixer and then filmed onto silicone release paper. This resin film was then impregnated onto unidirectional intermediate modulus carbon fibre which produced a prepreg with an areal weight of 268 g/m² at 35 wt. % of resin. Two six-ply prepregs were produced (lay up ±0/90) which were approximately 60 cm by 60 cm and were cured on a vacuum table at a pressure of 7 bar at 177° C. for 2 hours. A lightning strike test was then carried out on each panel according to the method of Comparative Example 16.

The simulated lightning strikes did not penetrate the modified composite panels.

An Ultrasonic c-scan was carried out on the lightning struck panels using an R/D Tech Omniscan MX from Olympus. The scans showed that the white areas of the modified panels were reduced in comparison to the unmodified panels of Example 16.

Therefore, the panels with metal coated particles have a much reduced damage area when compared to the comparative example 16 panels.

TABLE 12

Test parameters of lightning strike tests for Example 17.

| Panel No. | A Component Current, I (kA) | Action Integral, AI ($10^6 A^2 s$) | B Component current, I (kA) | C Component Charge, Q |
|---|---|---|---|---|
| 1 | 197.1 | 2.20 | 1.74 | 25.0 |
| 2 | 195.1 | 2.10 | 1.75 | 29.3 |

TABLE 13

Description of damaged area after lightning strike tests for Example 17.

| Panel No. | Description of Damage |
|---|---|
| 1 | No visible damage to inner skin, split & tufted over 280 × 240 mm on outer skin |
| 2 | No visible damage to inner skin, split & tufted over 280 × 220 mm on outer skin |

Example 18

Simulated Lightning Strikes with Conductive Particles

M21 resin was modified with silver coated glass spheres (2 vol. %, 5 wt. % of resin and carbon nanofibre (150 nm diameter and 1-10 μm long, 2 wt % of resin) blended using a Winkworth mixer and then filmed onto silicone release paper. This resin film was then impregnated onto unidirectional intermediate modulus carbon fibre which produced a prepreg with an areal weight of 268 g/m² at 35 wt. % of resin. Two six-ply prepregs were produced (lay up ±0/90) which were approximately 60 cm by 60 cm and were cured on a vacuum table at a pressure of 7 bar at 177° C. for 2 hours. A lightning strike test was then carried out on each panel according to the method of Comparative Example 16.

The simulated lightning strikes did not penetrate the modified composite panels.

An Ultrasonic c-scan was carried out on the lightning struck modified panels using an R/D Tech Omniscan MX from Olympus. The scan showed that the white area of the modified panels was reduced in comparison to the unmodified panel of Comparative Example 16.

Therefore, the modified panels with metal coated particles and carbon nanofibres had a much reduced damage area when compared to the panels of Comparative Example 16.

TABLE 14

Test parameters of lightning strike tests for Example 18.

| Panel No. | A Component Current, I (kA) | Action Integral, AI ($10^6 A^2 s$) | B Component current, I (kA) | C Component Charge, Q |
|---|---|---|---|---|
| 1 | 198.4 | 2.20 | 1.74 | 25.0 |
| 2 | 197.1 | 2.10 | 1.75 | 29.3 |

TABLE 15

Description of damaged area after lightning strike tests for Example 18.

| Panel No. | Description of Damage |
|---|---|
| 1 | No visible damage to inner skin, 300 mm split, tufting over 300 × 200 mm on outer skin. |
| 2 | No visible damage to inner skin, 300 mm split, tufting over 200 × 200 mm on outer skin. |

It is therefore shown that use of electrically conductive particles in a polymeric resin of an interleafed composite material provides for reduced resistivity. This reduced resistivity provides improved performance of the composite material during lightning strikes as shown in Comparative Example 16 and Examples 17 to 18.

FIG. 1 is a simplified representation 50 of a photomicrograph of a cross section of a composite panel made according to Example 17. The silver coated glass spheres 53 are located in the resin interleafs 52, and are contacting the carbon plies 51. The thickness (t) of the resin interleafs 52 are 20 μm, which corresponds to the diameter of the silver coated glass spheres 53. As can be seen from FIG. 1, the glass microspheres form individual conductive bridges that electrically link the carbon plies 51 together and provide spacing between the carbon plies 51.

Figure 2:
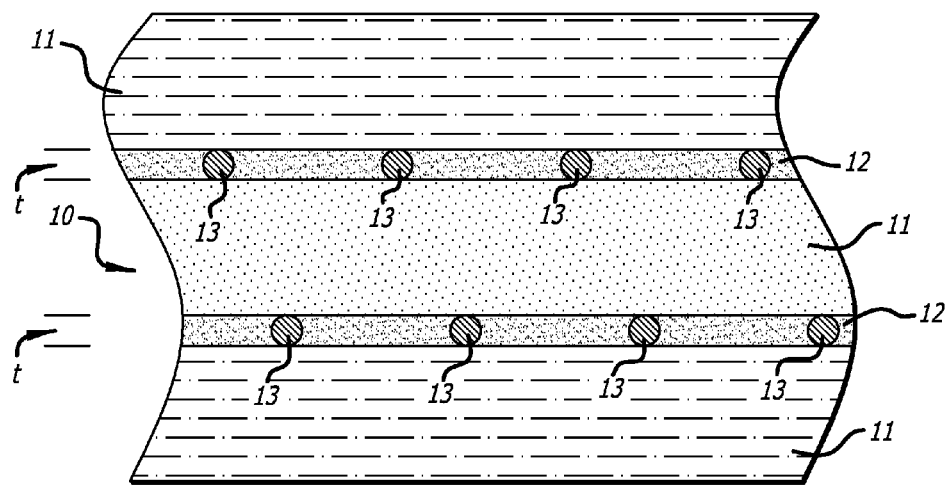
FIG. 2 is a simplified representation of a cross-sectional view of a laminate made according to Example 11 wherein 100 μm silver-coated solid glass spheres form conductive bridges across wider resin interleaf layers.

FIG. 2 is a simplified representation of the cross section of a portion of a composite material 10 made in accordance with Example 11. The silver coated glass spheres 13 are located in the resin interleafs 12 and are contacting the carbon plies 11. The thickness (t) of the resin interleafs 12 are 100 μm, which corresponds to the diameter of the silver coated glass spheres 13. As can also be seen from FIG. 2, the larger glass microspheres form individual conductive bridges that electrically link the carbon plies 11 together and provide spacing between the carbon plies 11.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:
1. An interleaf composite material which is curable to form a panel, that is not penetrated by a lightning strike, said composite material comprising:
 at least four conductive fibrous layers comprising a plurality of electrically conductive fibers;
 electrically insulating resin layers located between said conductive fibrous layers, said electrically insulating resin layers each having an average thickness and comprising a resin formulation comprising a polymeric resin; and
 conductive bridges that extend across said electrically insulating resin layers to provide electrical connections between said conductive fibrous layers wherein said conductive bridges comprise electrically conductive particles wherein at least 50%, of said electrically conductive particles have a diameter that is within 10 μm of the average thickness of said electrically insulating resin layers and wherein the number of said electrically conductive bridges is sufficient to prevent penetration of said composite material by a lightning strike once said interleaf composite material has been cured to form said panel.

2. An interleaf composite material according to claim 1 wherein said electrically conductive particles are present in an amount of between 0.2 vol. % and 2.0 vol. % of said interleaf composite material.

3. An interleaf composite material according to claim 1 wherein said resin formulation comprises electrically conductive nano materials.

4. An interleaf composite material according to claim 1 wherein said electrically conductive particles comprise a non-electrically conductive core and an electrically conductive coating surrounding said core.

5. An interleaf composite material according to claim 4 wherein said core comprises a thermoplastic polymer.

6. An interleaf composite material according to claim 1 wherein said electrically conductive particles have an aspect ratio of between 1 and 10.

7. An interleaf composite material according to claim 1 wherein said electrically conductive fibers are carbon fibers.

8. An interleaf composite material according to claim 1 wherein said electrically conductive particle is a carbon particle.

9. An interleaf composite material according to claim 1 wherein said polymeric resin comprises a toughening agent and/or toughening particles.

10. An interleaf composite structure comprising a composite material according to claim 1 wherein said polymeric resin has been cured.

11. A method for making an interleaf composite material which is curable to form a panel that is not penetrated by a lightning strike, said method_comprising the steps of:
    providing at least four conductive fibrous layers comprising a plurality of electrically conductive fibers;
    providing electrically insulating resin layers located between said conductive fibrous layers, said electrically insulating resin layers each having an average thickness and comprising a resin formulation comprising a polymeric resin; and
    forming conductive bridges extending across said resin layers to provide an electrical connection between said conductive fibrous layers wherein said conductive bridges comprise electrically conductive particles wherein at least 50% of said electrically conductive particles have a diameter that is within 10 μm of the average thickness of said electrically insulating resin layers and wherein the number of said electrically conductive bridges is sufficient to prevent penetration of said composite material by a lightning strike once said interleaf composite material has been cured to form said panel.

12. A method for making an interleaf composite material according to claim 11 wherein said electrically conductive particles are present in an amount of between 0.2 vol. % and 20 vol. % of said composite material.

13. A method for making an interleaf composite material according to claim 11 wherein said resin formulation additionally comprises electrically conductive nano materials.

14. A method for making an interleaf composite material according to claim 11 wherein said electrically conductive particle comprises a non-electrically conductive core and an electrically conductive coating surrounding said core.

15. A method for making an interleaf composite material according to claim 14 wherein said core comprises a thermoplastic polymer.

16. A method for making an interleaf composite material according to claim 9 wherein said electrically conductive particles have an aspect ratio of between 1 and 10.

17. A method for making an interleaf composite material according to claim 11 wherein said electrically conductive fibers are carbon fibers.

18. A method for making an interleaf composite material according to claim 11 that includes the additional step of curing said polymeric resin to form said panel.

19. A method for making an interleaf composite material according to claim 11 wherein said electrically conductive particle is a carbon particle.

20. A method for making an interleaf composite material according to claim 11 wherein said polymeric resin comprises a toughening agent and/or toughening particles.

* * * * *